(12) United States Patent  
Williams

(10) Patent No.: US 9,188,108 B2  
(45) Date of Patent: Nov. 17, 2015

(54) FLOATING WIND FARM

(71) Applicant: Herbert L. Williams, East Palatka, FL (US)

(72) Inventor: Herbert L. Williams, East Palatka, FL (US)

(*) Notice: Subject to any disclaimer, the term of this patent is extended or adjusted under 35 U.S.C. 154(b) by 0 days.

(21) Appl. No.: 14/537,473

(22) Filed: Nov. 10, 2014

(65) Prior Publication Data

US 2015/0056076 A1    Feb. 26, 2015

Related U.S. Application Data

(63) Continuation-in-part of application No. 13/451,249, filed on Apr. 19, 2012, now Pat. No. 8,884,458.

(51) Int. Cl.
*F03D 11/04* (2006.01)
*F03D 9/00* (2006.01)
*F03D 9/02* (2006.01)

(52) U.S. Cl.
CPC ............ *F03D 11/045* (2013.01); *F03D 9/001* (2013.01); *F03D 9/002* (2013.01); *F03D 9/008* (2013.01); *F03D 9/028* (2013.01); *F03D 11/04* (2013.01); *F05B 2240/93* (2013.01); *F05B 2240/96* (2013.01); *F05B 2250/70* (2013.01); *Y02E 10/727* (2013.01); *Y02E 60/15* (2013.01); *Y02E 60/17* (2013.01)

(58) Field of Classification Search
CPC .......... F03D 9/001; F03D 9/028; F02E 10/727
USPC ........................................ 290/44, 55
See application file for complete search history.

(56) References Cited

U.S. PATENT DOCUMENTS 8,884,458 B2 *   11/2014   Williams ............... F03D 9/001
                                                         290/55

* cited by examiner

*Primary Examiner* — Tho D Ta
(74) *Attorney, Agent, or Firm* — Thomas C. Saitta

(57) ABSTRACT

A floating wind farm having wind machines positioned on a generally V-shaped floating platform, the platform being tethered to an anchor such that the platform is free to be repositioned by the wind for optimum production. The wind machines power air compressors and the floating platform itself comprises large storage chambers to receive the compressed air, or storage chambers to receive liquefied air.

17 Claims, 6 Drawing Sheets

FLOATING WIND FARM

This application is a continuation-in-part application of U.S. patent application Ser. No. 13/451,249, filed Apr. 19, 2012, now U.S. Pat. No. 8,884,458 issued Nov. 11, 2014, which claims the benefit of U.S. Provisional Patent Application Ser. No. 61/517,457, filed Apr. 20, 2011, the disclosures of which is incorporated herein by reference.

BACKGROUND OF THE INVENTION

This invention relates generally to the field of wind powered devices, commonly referred to as wind machines. More particularly the invention relates to wind machines used to provide a stored source of energy, typically electrical energy. Even more particularly, the invention relates to wind machines that are mounted to floating structures, such that wind farms comprising multiple wind machines can be situated in bodies of water.

Wind machines comprising bladed rotor members are well known and have been around for hundreds of years. The rotating blade assemblies are positioned on towers or other static structures and the rotational energy is used to drive a generator, air compressor, water pump, grinding mill or other equipment. In recent times interest in wind machines has increased as a viable alternative energy source to replace the reliance on fossil fuels. Generating large amounts of energy require large numbers of wind machines, and such collections are referred to as wind farms. One of the problems with wind farms are that they occupy a large area and are not aesthetically pleasing. A solution to these problems is to locate the wind machines offshore, which create additional problems, such as the need for underwater support structures. To address this problem, floating wind machines have been developed, wherein single or multiple wind machine towers are supported by a floating platform.

The known floating wind machines are electrical generators and the electricity generated by the wind machine is transferred to shore using cables and sold as "as available" electricity. Such systems complicate the delivery and storage of the generated power, and the wind machines may be nonproductive for extended periods of time if the winds are not steady. It is an object of this invention to provide a plurality of wind machines supported by a floating platform, thereby defining a wind farm, wherein known problems of traditional floating wind farms are addressed by utilizing the wind machines to compress and/or liquefy air which is then stored in the floating platform, the compressed or liquified air then being released at a steady-state pressure to drive one or more generators to produce electricity, thereby providing power at a steady rate even when the wind is intermittent. Alternatively, the compressed or liquified air may be transferred to tanker vessels for delivery elsewhere, or the compressed or liquified air may be delivered to shore through suitable conduits. Other objects of the invention are to provide optimal configurations for the floating platform such that production is maximized, maintenance and repair of the wind machines is simplified, and transport and anchoring of the wind farm is more easily accomplished.

SUMMARY OF THE INVENTION

The invention is a floating wind farm in various embodiments. The floating wind farm comprises a plurality of wind machines positioned on a generally V-shaped floating platform member, the platform member being tethered to an anchor such that the platform member is free to be repositioned by the wind for optimum production and to create a breakwater for arriving vessels to dock while heading into the wind. The wind machines power air compressors, and the floating platform further comprises electrical generators, refrigeration equipment and other required equipment for liquefying air large storage tanks for the compressed or liquified air, which may be used to power electrical generators or the like, or which may be loaded onto standard or cryogenic tanker vessels, such as LNG tankers, to be transported to other locations to be used as stored capacity to power electrical generators. Alternatively, the floating wind farm may further comprise equipment to separate oxygen and nitrogen for storage, delivery and transport. In an embodiment, the wind machines are mounted on collapsible or folding towers such that the blade assemblies can be lowered to the level of the floating platform member for repair or maintenance, or to protect them when excessive winds are expected. In another possible embodiment, the V-shaped floating platform is provided with a hinged connection such that the legs of the V can be brought together for easier transport on the water. In another possible embodiment, the V-shaped floating platform is provided with a detachable bow anchor member, the anchor member comprising a ballast chamber that can be filled with air from the surface in order to raise the anchor member. In another embodiment, underwater turbine machines can be provided beneath the floating platform member, with or without wind machines, to provide energy from currents or tides.

Alternatively expressed, the invention in various embodiments is a floating wind farm for the production of compressed or liquefied air comprising a V-shaped floating platform comprising one or more air storage chambers adapted to receive and store compressed or liquefied air, said air storage chambers occupying the majority of the volume of the floating platform; and a plurality of wind machines mounted onto said floating platform, said wind machines producing compressed air; or expressed as a floating wind farm for the production of liquefied air comprising a V-shaped floating platform comprising a pair of leg members joined to form an apex, each said leg member comprising one or more cryogenic air storage chambers adapted to receive and store liquefied air, wherein said cryogenic air storage chambers occupy the majority of the volume of the floating platform; air liquefication equipment comprising air compressors, said air liquefication equipment adapted to produce said liquefied air for storage in said cryogenic storage chambers; a plurality of wind machines mounted onto said floating platform, said wind machines powering said air compressors; or expressed as a floating wind farm for the production of liquefied air comprising a V-shaped floating platform comprising a pair of leg members joined to form an apex, each said leg member comprising one or more liquified air storage tanks, and wherein said liquified air storage tanks occupy the majority of the volume of the floating platform; a plurality of wind machines mounted onto said floating platform, said wind machines powering air liquefication equipment to produce liquified air for storage in said liquified air storage tanks.

DETAILED DESCRIPTION OF THE INVENTION

With reference to the drawings, the various embodiments will now be described in detail with regard for the best mode and preferred embodiments.

Figure 1:
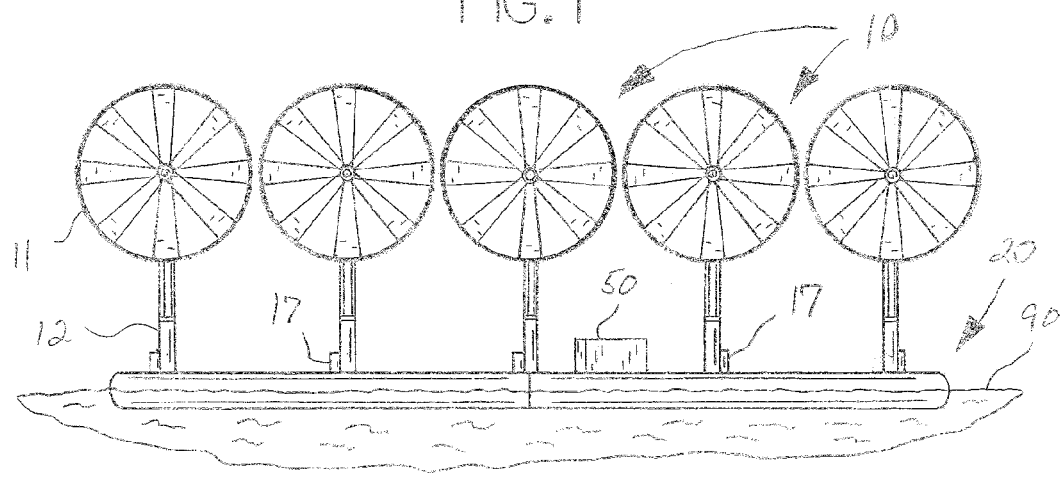
FIG. 1 is a front view of a V-shaped floating wind farm.
Figure 2:
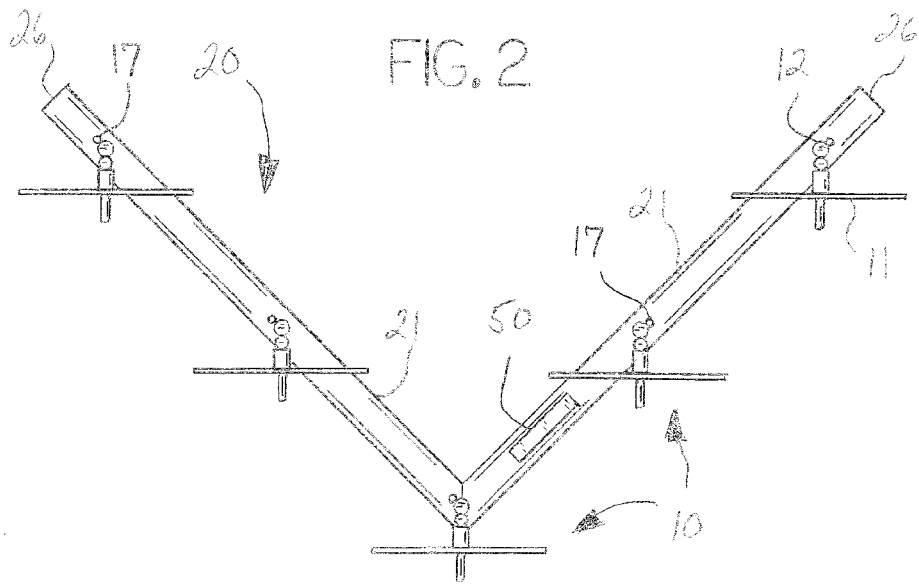
FIG. 2 is a top view of the floating wind farm of FIG. 1.
Figure 3:
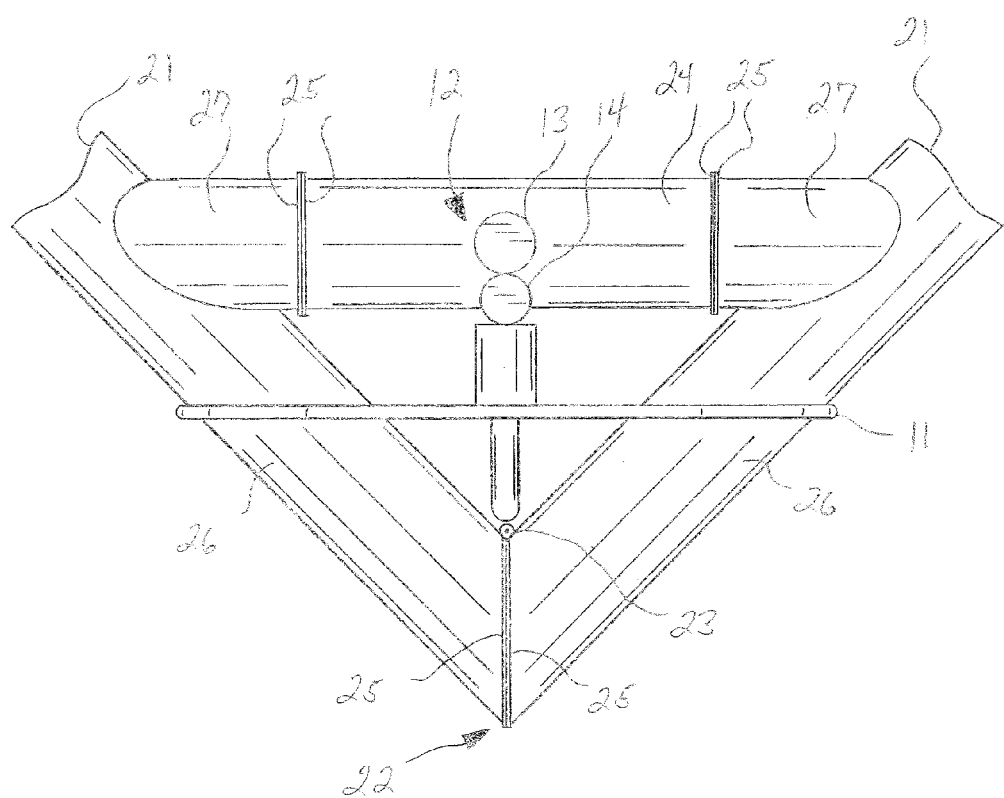
FIG. 3 is a partial top view of an alternative embodiment of a V-shaped floating wind farm showing a hinged connection and cross brace member.

As shown in FIGS. 1 and 2, the wind farm comprises a plurality of wind machines 10 positioned on a generally V-shaped floating platform member 20. The wind machines 10 may be of known structure and each wind machine 10 comprises in general a rotating blade assembly 11 mounted onto a tower member or similar structural support member 12. The rotational energy resulting from the wind turning the blade assemblies 11 is transferred in known manner, such as for example hydraulically, mechanically using belts, cables, ropes or similar members, to one or more air compressors 17 which may be mounted internally to the wind machine 10 or the floating platform 20 to minimize exposure to the elements. The wind machines 10 are positioned in offset manner such that a more forward wind machine 10 does not interfere with or reduce the wind striking a more rearward wind machine 10. The V-shaped floating platform 20 is anchored or tethered to the bottom or shore from the apex of the V-shape in a manner that allows the floating platform 20 to reorient its positional alignment whenever the wind direction changes, such that the bow 22 of the platform member 20 as shown in FIG. 3, will always face into the wind, thus optimizing rotation of the wind machines 10 at all times and creating a breakwater for berthing or docking vessels while loading or unloading.

The floating platform member 20 is comprised of a pair of generally tubular members that form legs 26, the legs 26 comprising and defining large compressed air or liquefied air accumulators, tanks or storage chambers 21, such that the compressed or liquefied air produced by the wind machines 10 is stored within the floating platform member 20. The size and number of the chambers 21 may vary, but the total cumulative volume of the chambers 21 will comprise the majority of the volume of the legs 26.

For liquefied air, the storage chambers 21 will be cryogenic chambers or tanks sufficiently insulated and otherwise adapted in known manner to retain the liquefied air, and the wind farm will be provided with air liquefication equipment 51 of suitable known type, powered by diesel motors, compressed air or electricity generated on board the wind farm, or even directly by wind power, capable of liquefying air under the Linde process or similar processes and delivering the liquefied air to cryogenic storage chambers 21 through suitable conduits. The air compressors 17 are preferably incorporated as components of the air liquefication equipment 51, whereby air is condensed and expanded in a repeating step process in known manner to reduce the temperature of the air below approximately −195 degrees C., thereby condensing the air into its liquid state.

When the floating wind farm is set in the desired location and becomes operational, the air storage chambers 21 are charged by the wind machines 10. The compressed or liquefied air within the storage chambers 21 can be used to operate one or more electrical generators 50, which may be provided internally or externally on the floating platform 20, on a ship or separate floating platform, or on shore if the distance is not prohibitive for transfer of the compressed or liquefied air through pipeline conduits. Air in storage can be released in a regulated and controlled manner at the pressure needed to operate the electrical generators in a steady-state manner. Thus, in long periods of no wind, there can be a sufficient reserve of air within the storage chambers 21 to provide continuing power.

In alternative embodiments, the compressed or liquefied air may be transferred directly to tanker vessels berthed at the floating wind farm. With liquefied air the tanker vessels will be cryogenically outfitted. Alternatively still, the floating wind farm may further comprise gas separation equipment 52 of suitable known type to separate the air into oxygen and nitrogen for storage, delivery and transport. For example, the gas separation equipment 52 may be adapted to allow the temperature of the liquefied air in the cryogenic storage chambers 21 to rise to a temperature above the boiling point of liquid nitrogen while remaining below the boiling point of liquid oxygen, whereby the gaseous nitrogen can be captured and stored separately from the liquefied oxygen.

Another advantage of the V-shaped platform member 20 is that it provides a relatively calm docking area for ships between the legs 26 of the platform 20 downwind of the wind machines 10, since the platform 20 will block surface waves and the wind machines 10 will disrupt air currents. The floating platform member 20 and wind machines 10 are not restricted to any particular size, and the structure of the wind farm allows the platform 20 and wind machines 10 to be relatively large. The length of the legs 26 of the platform 20 can be changed by adding or removing tubular segments to the free ends, such that the compressed or liquefied air storage capacity can be increased or decreased and the number of wind machines 10 can be increased or decreased. For exemplary purposes only, with no desire to limit the size and dimensions of the wind farm, a suitable representative wind farm may comprise a floating platform member 20 having legs 26 approximately 48 feet in diameter and approximately 3000 feet in length, with 25 wind machines 10 having blade assemblies approximately 425 feet in diameter positioned on towers approximately 280 feet tall. Alternatively, wind farms much smaller or larger in size can be constructed.

Figure 4:
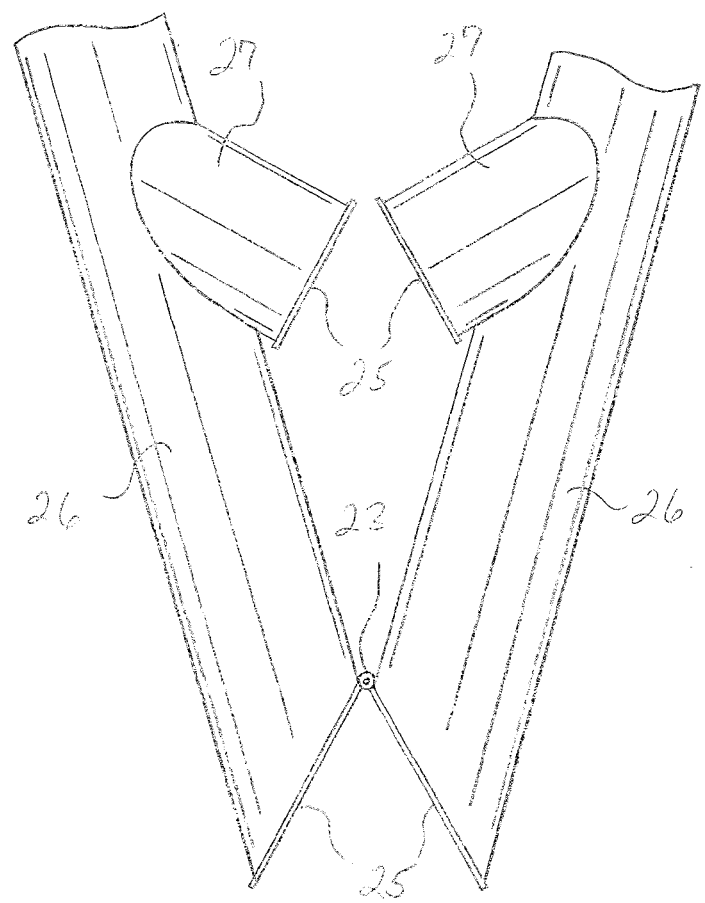
FIG. 4 is a partial top view of the embodiment of FIG. 3 with the cross brace member removed and the legs of the floating platform member brought together for transport.

An alternative embodiment for the floating wind platform 20 is illustrated in FIGS. 3 and 4. In this embodiment, the two leg members 26 forming the V-shape are each capped with a sealing connection flange 25 and are joined to each other by a hinged connector 23. With this structure, the legs 26 can be folded together to present a narrower profile when the platform 20 is being towed into position, as shown in FIG. 4. Once at the desired site, the legs 26 are pivoted outward and the connection flanges 25 are secured together. Preferably, a cross brace member 24 is provided, the cross brace member 24 being provided with sealing connection flanges 25 for connection to the sealing connection flanges 25 of the brace mounts 27 positioned on the legs 26 after the legs 26 have been pivoted apart. The forward-most wind machine 10 may be mounted onto the cross brace member 24 so that it is centered relative to the floating platform 20.

Figure 5:
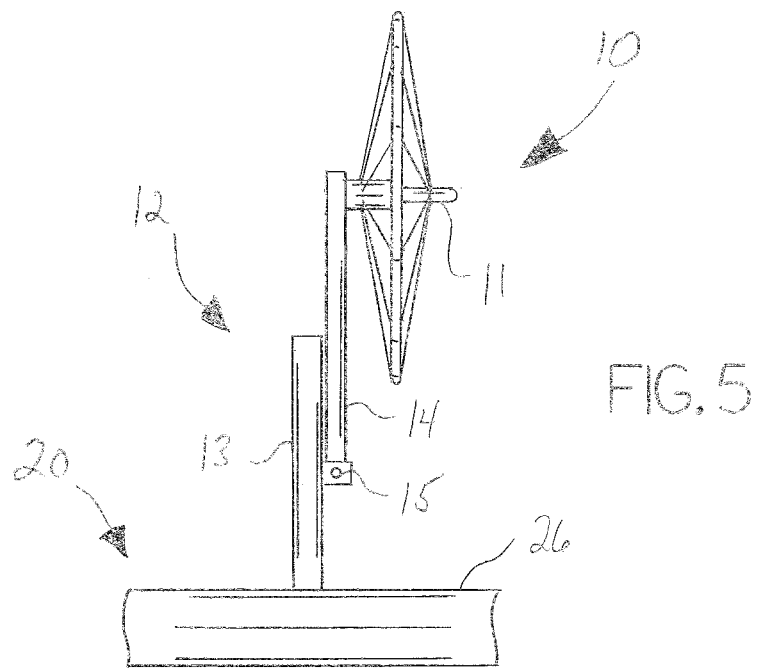
FIG. 5 is a side view of an embodiment of a collapsible wind machine in the operational position.
Figure 6:
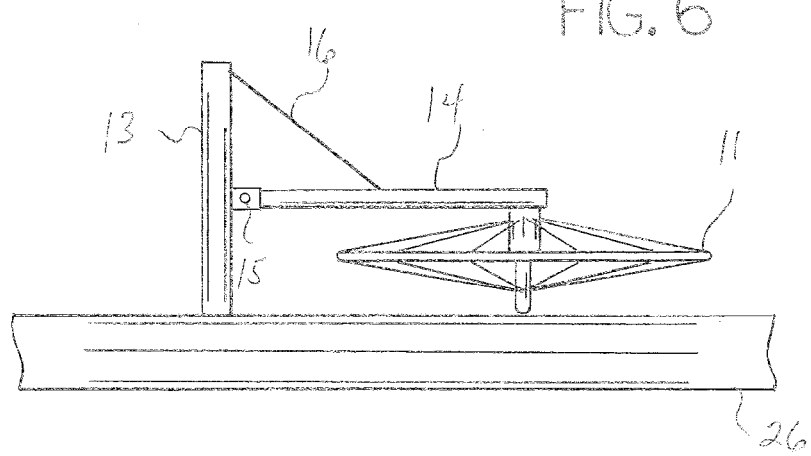
FIG. 6 is a side view of the wind machine of FIG. 5 in the collapsed position.

In a preferred embodiment shown best in FIGS. 5 and 6, the wind machines 10 are constructed so as to be collapsible or foldable. This provides for a lower profile when the wind farm is being transported into position, easier access to the blade assemblies 11 for repair or maintenance, as well as providing a means for protecting the blade assemblies 11 during high wind events such as storms or hurricanes. In the embodiment shown, the tower 12 comprises the combination of a lower fixed tower segment 13 that is mounted onto the floating platform member 20 and an upper hinged tower segment 14 that is joined by a hinged mount 15 to the fixed tower segment 13. With this structure each blade assembly 11 can be lowered utilizing a winch line 16 operated by a winch (not shown) from a vertical orientation as seen in FIG. 5 to a horizontal orientation at approximately the same height as the deck surface of the floating platform member 20 as seen in FIG. 6. The hinge mount 15 is preferably oriented such that a portion of the blade assembly 11 is reachable from the floating platform 20, thereby allowing repairs or maintenance of the blade assembly 11 without requiring a floating barge or ship.

Figure 7:
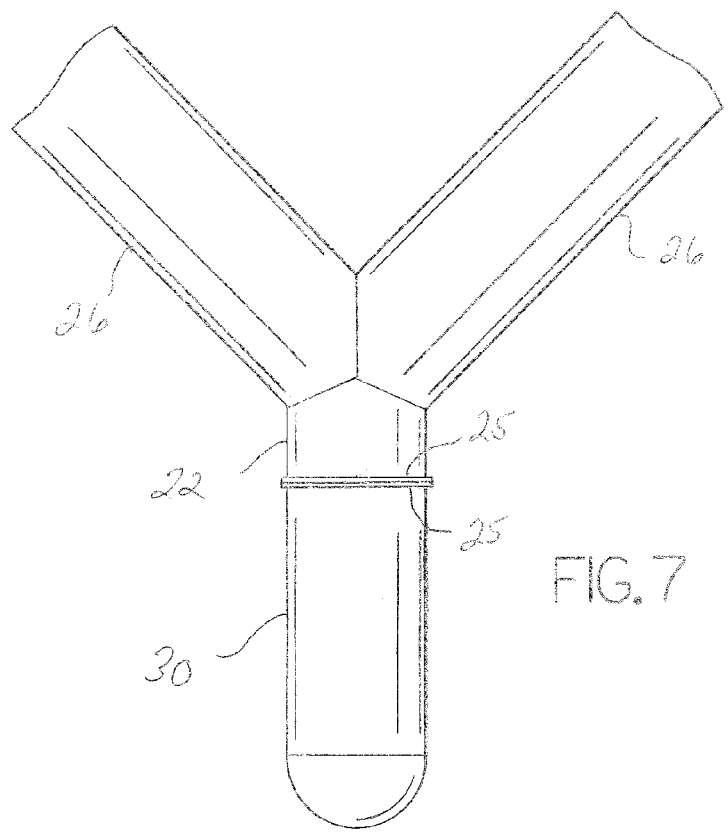
FIG. 7 is a top view of an embodiment of the floating wind farm having a detachable bow anchor.
Figure 8:
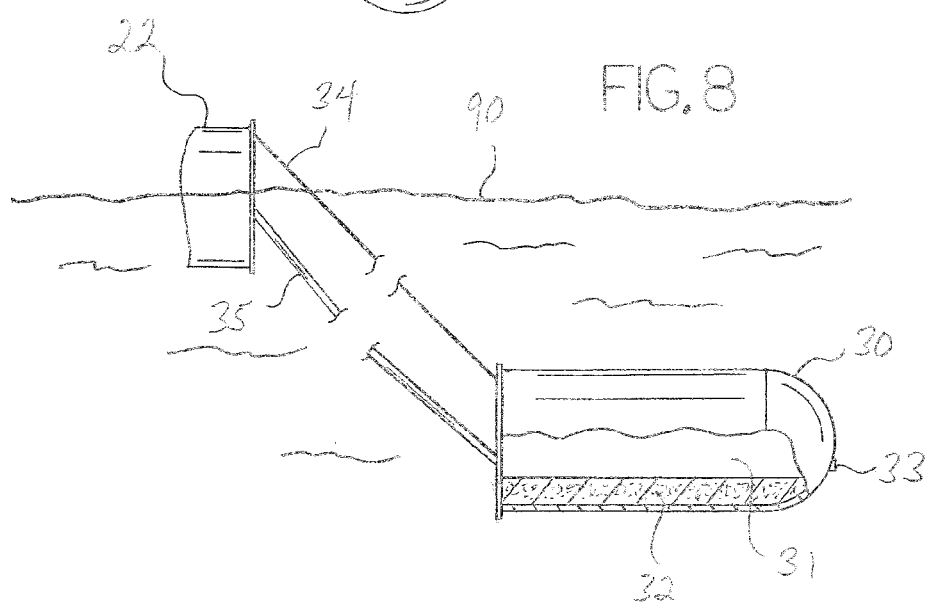
FIG. 8 is a view of the bow anchor as deployed from the floating platform member.

In another alternative embodiment, the floating platform 20 is provided with a detachable bow anchor 30, as shown in FIGS. 7 and 8. The bow anchor 30 as shown is preferably an elongated tubular member removably mounted to the bow 22 of the platform 20 using sealing connection flanges 25. The bow anchor 30 comprises a ballast chamber 31 with a relatively large interior space. If needed for submersion or securing purposes, the bow anchor 30 may further comprise permanent ballast material 32, such as for example cured concrete or the like. The bow anchor 30 is structured such that water is allowed to enter the ballast chamber 31 so that when the anchor 30 is detached from the floating platform 20 it is sufficiently heavy to sink to the bottom. The bow anchor 30 is tethered to the floating platform by a winch line 34 for retrieval of the bow anchor 30 if needed. An air conduit 35 also extends from the floating platform member 20 to the bow anchor 30. If the anchor 30 needs to be retrieved, compressed air is delivered through the air conduit 35 into the ballast chamber 31 to displace the water through a release valve 33 or similar member in order to lighten the bow anchor 30. This makes retrieval of the anchor 30 easier, and the anchor 30 may be designed such that the quantity of air is sufficient to float the anchor.

Figure 9:
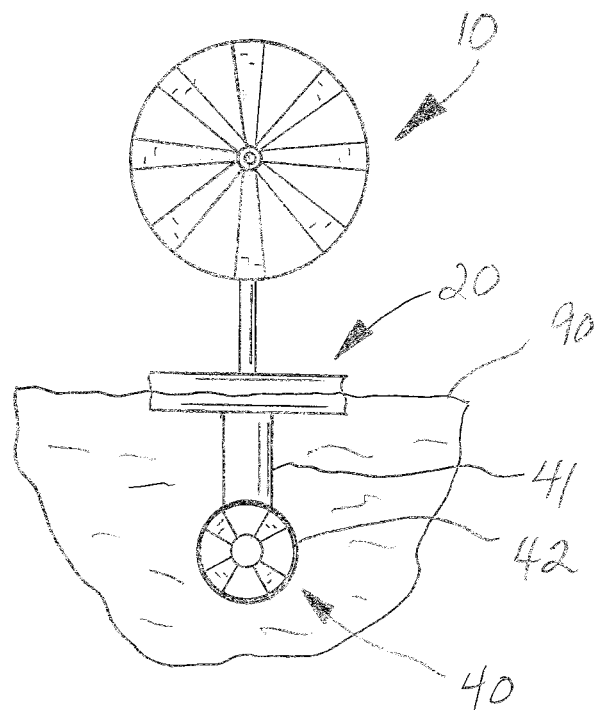
FIG. 9 is a partial view of an embodiment of the floating wind farm comprising both wind machines and hydro-turbines.
Figure 10:
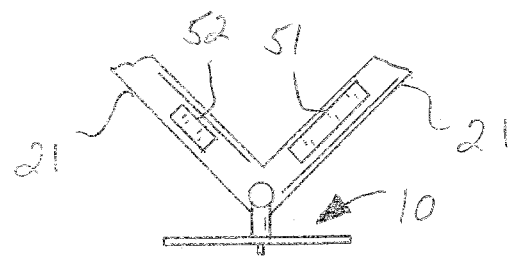
FIG. 10 is a partial top view of an alternative embodiment showing a floating wind farm capable of liquefying air and separating nitrogen from the liquified air.

In still another alternative embodiment as shown in FIG. 9, the wind farm may be provided with hydro-turbines 40 comprising submerged mounting members 41 and rotor assemblies 42, the hydro-turbines 40 being mounted beneath the floating platform member 20 to supplement the wind machines 10, the hydro-turbines 40 driving a second set of air compressors 17 in response to water currents, wave action or tidal flow to deliver air to the storage chambers 21. Any suitable type of hydro-turbine capable of producing compressed air may be utilized, such as for example the hydro-turbine shown in U.S. Pat. No. 6,729,840, the disclosure of which is incorporated herein by reference.

It is understood that equivalents and substitutions of certain elements and structures set forth above may be obvious to those of ordinary skill in the art, and therefore the true scope and definition of the invention is to be as set forth in the following claims.

I claim:

1. A floating wind farm for the production of compressed or liquefied air comprising:
   a V-shaped floating platform comprising one or more air storage chambers adapted to receive and store compressed or liquefied air, said air storage chambers occupying the majority of the volume of the floating platform;
   a plurality of wind machines mounted onto said floating platform, said wind machines producing compressed air.

2. The floating wind farm of claim 1, further comprising a plurality of hydro-turbines mounted beneath said floating platform and a second set of air compressors, said hydro-turbines powering a second set of air compressors producing and delivering compressed air to said refrigeration equipment to produce liquefied air for storage in said cryogenic chambers.

3. The floating wind farm of claim 1, further comprising a bow anchor releasably connected to the apex of said V-shaped floating platform, said bow anchor comprising a ballast chamber having a release valve, a winch line extending between said bow anchor and said floating platform, and an air conduit extending between said bow anchor and said floating platform;
   whereby with said bow anchor detached from said floating platform, said bow anchor is raised by delivering compressed air into said ballast chamber to expel water from said ballast chamber through said release valve and then retrieving said bow anchor with said winch line.

4. The floating wind farm of claim 1, each of said wind machines comprising a blade assembly mounted onto a tower member, said tower member comprising a lower fixed tower segment mounted to said floating platform and an upper hinged tower segment, said upper hinged tower segment joined to said lower fixed tower segment by hinge mount whereby said blade assembly and said upper hinged tower segment are pivotable downward.

5. The floating wind farm of claim 1, wherein said floating platform comprises a pair of leg members joined to form an apex, thereby creating a breakwater for docking vessels while loading or unloading.

6. The floating wind farm of claim 5, wherein said leg members are joined by a hinged connector whereby said leg members can be pivoted toward each other.

7. The floating wind farm of claim 6, further comprising a removable cross brace member extending between said leg members.

8. The floating wind farm of claim 7, wherein one of said wind machines is mounted onto said cross brace member.

9. A floating wind farm for the production of liquefied air comprising:
   a V-shaped floating platform comprising a pair of leg members joined to form an apex, each said leg member comprising one or more cryogenic air storage chambers adapted to receive and store liquefied air, wherein said cryogenic air storage chambers occupy the majority of the volume of the floating platform;
   air liquefication equipment comprising air compressors, said air liquefication equipment adapted to produce said liquefied air for storage in said cryogenic storage chambers;
   a plurality of wind machines mounted onto said floating platform, said wind machines powering said air compressors.

10. The floating wind farm of claim 9, wherein said liquefied air is transferable to tanker vessels.

11. The floating wind farm of claim 9, wherein said liquefied air is transferable to shore through pipeline conduits.

12. The floating wind farm of claim 9, further comprising at least one electrical generator powered by said wind machines.

13. The floating wind farm of claim 9, further comprising at least one electrical generator powered by said liquefied air from said cryogenic storage chambers.

14. The floating wind farm of claim 9, further comprising gas separation equipment, whereby nitrogen gas is separated from said liquefied air.

15. A floating wind farm for the production of liquified air comprising:
- a V-shaped floating platform comprising a pair of leg members joined to form an apex, each said leg member comprising one or more liquified air storage tanks, and wherein said liquified air storage tanks occupy the majority of the volume of the floating platform;
- a plurality of wind machines mounted onto said floating platform, said wind machines powering air liquefication equipment to produce liquified air for storage in said liquified air storage tanks.

16. The floating wind farm of claim 15, wherein said air liquefication equipment comprises air compressors powered by said wind machines.

17. The floating wind farm of claim 16, wherein said V-shaped floating platform creates a breakwater for docking tanker vessels to receive and transport said liquified air.

* * * * *